(12) United States Patent
Kunik et al.

(10) Patent No.: US 8,100,989 B2
(45) Date of Patent: Jan. 24, 2012

(54) METHOD AND SYSTEM OF MAKING A BURNABLE FUEL

(76) Inventors: Burton J. Kunik, Houston, TX (US); James C. Berns, Carthage, TX (US)

( * ) Notice: Subject to any disclaimer, the term of this patent is extended or adjusted under 35 U.S.C. 154(b) by 0 days.

(21) Appl. No.: 12/610,331

(22) Filed: Nov. 1, 2009

(65) Prior Publication Data

US 2011/0099894 A1    May 5, 2011

(51) Int. Cl.
*C10L 5/00* (2006.01)

(52) U.S. Cl. ............ 44/504; 44/551; 44/593; 44/595; 44/589; 44/605

(58) Field of Classification Search ............ 44/504, 44/551, 593, 595, 589, 605
See application file for complete search history.

(56) References Cited

U.S. PATENT DOCUMENTS

| | | | |
|---|---|---|---|
| 4,236,897 A | 12/1980 | Johnston | |
| 4,395,265 A | 7/1983 | Reilly et al. | |
| 4,529,407 A | 7/1985 | Johnston et al. | |
| 4,822,379 A | 4/1989 | Thompson | |
| 5,106,594 A | 4/1992 | Held et al. | |
| 5,173,257 A | 12/1992 | Pearson | |
| 5,188,649 A | 2/1993 | Macedo et al. | |
| 5,223,231 A * | 6/1993 | Drake | 422/297 |
| 5,265,545 A | 11/1993 | Milner | |
| 5,270,000 A | 12/1993 | Goldner et al. | |
| 5,342,418 A * | 8/1994 | Jesse | 44/589 |
| 5,643,342 A | 7/1997 | Andrews | |
| 5,743,924 A | 4/1998 | Dospoy et al. | |
| 5,830,419 A | 11/1998 | Held et al. | |
| 5,833,922 A | 11/1998 | Held et al. | |
| 5,837,171 A | 11/1998 | Danzik et al. | |
| 5,888,256 A | 3/1999 | Morrison | |
| 6,045,070 A | 4/2000 | Davenport | |
| 6,344,638 B1 | 2/2002 | Tomasello | |
| 6,506,223 B2 | 1/2003 | White | |
| 6,635,093 B1 | 10/2003 | Schoen et al. | |
| 7,032,322 B1 | 4/2006 | Smith | |
| 7,565,299 B2 | 7/2009 | Mallett et al. | |
| 2004/0200138 A1 * | 10/2004 | Parish | 44/553 |
| 2006/0096163 A1 | 5/2006 | Dickinson et al. | |
| 2008/0029444 A1 | 2/2008 | Mallett et al. | |
| 2008/0073251 A1 | 3/2008 | Reshamwala et al. | |
| 2008/0247904 A1 | 10/2008 | Paskalov | |
| 2009/0283015 A1 | 11/2009 | Gasser et al. | |

FOREIGN PATENT DOCUMENTS

| | | | |
|---|---|---|---|
| JP | 10263022 A | 10/1998 | |
| JP | 10263023 A | 10/1998 | |
| JP | 2004338989 | * 12/2004 | |

* cited by examiner

*Primary Examiner* — Cephia D Toomer
(74) *Attorney, Agent, or Firm* — Robert W Strozier (57) ABSTRACT

Methods and systems are disclosed for direct conversion of a used healthcare material into a burnable fuel and to burnable fuels derived therefrom.

54 Claims, 10 Drawing Sheets

METHOD AND SYSTEM OF MAKING A BURNABLE FUEL

BACKGROUND OF THE INVENTION

1. Field of the Invention

Embodiments of the present invention relate to methods for making a burnable fuel from used healthcare materials, to systems for converting the used healthcare materials into a burnable fuel, to burnable fuels derived from the methods and systems and methods and systems for using the burnable fuel.

More particularly, embodiments of the present invention relate to methods for making a burnable fuel from used healthcare materials, to systems for converting the used healthcare materials into a burnable fuel source, to burnable fuels derived from the methods and systems and methods and systems for using the burnable fuel, where the methods include the steps of disinfecting and/or partially or completely sterilizing a used healthcare material including metals or metallic materials to form a disinfected material, sizing the disinfected material to form a sized, disinfected material and formulating the sized, disinfected material into a burnable fuel. The method can also include the step of pelletizing the sized, disinfected material into a shaped burnable fuel.

2. Description of the Related Art

Like many used or waste materials, medical waste or used healthcare materials recycling has been and remains a goal, especially in today's climate of environmentalism. However, unlike many conventional waste materials, used healthcare materials have additional hazards and are generally considered and/or labeled as bio-hazards. Such labeling requires used healthcare materials to be handled in a different manner than many other waste materials.

Like many other waste materials, used healthcare materials constitute a complex mixture of materials including pulp or paper derived materials, plastic polymer derived materials, metals and metal derived materials, ceramic materials and ceramic derived materials, etc. Many conventional used healthcare material recycling methodologies require a separation of the material into components, especially metals and metal derived materials, before the material can then be post processed.

Thus, there is a need in the art for methods and systems that can readily convert used healthcare materials directly into a burnable fuel without the need for component separation.

SUMMARY OF THE INVENTION

Embodiments of this invention provide methods for converting a used healthcare material including a complex mixture of components including pulp materials, polymer materials, metal materials, and/or other material such as ceramic materials, ash materials, etc. directly into a burnable fuel, without the need for component separation.

Embodiments of this invention provide systems for converting a used healthcare material including the complex mixture of components materials directly into a burnable fuel, without the need for component separation.

Embodiments of this invention provide burnable fuels derived from methods and systems of this invention.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a method can be implemented that making a burnable fuel from a used healthcare material including a complex mixture of components, without the need for component separation, where the components include pulp materials, polymer materials, metal materials, and/or other materials such as ceramic materials, ash materials, etc. The resulting burnable fuel can be formulated for use as a suitable fuel in a number of different industries including cement plants, power plants, municipal incinerators for steam generation, or any other facility that burns fuels and converts heat derived from the burning of the fuel into a usable form of energy such as electrical energy, mechanical energy, chemical energy, etc. or uses the heat and ash to make an end product such as cement.

Embodiments of this invention relate of a method for converting a used healthcare material, where the material can include a complex mixture of components and where the components can include pulp materials, polymer materials, metal materials, and/or other materials such as ceramic materials, ash materials, etc. directly into a burnable fuel, without the need for component separation. The method includes providing a used healthcare material including a complex mixture of components. The method also includes disinfecting and/or partially or completely sterilizing the used healthcare material to form a disinfected material. The disinfected material is then sized or sized and partially or completely homogenized into a particulate burnable fuel.

Embodiments of this invention relate to a method for converting a used healthcare material, where the material can include a complex mixture of components and where the components can include pulp materials, polymer materials, metal materials, and/or other materials such as ceramic materials, ash materials, etc. directly into a burnable fuel, without the need for component separation. The method includes providing a used healthcare material including a complex mixture of components. The method also includes disinfecting and/or partially or completely sterilizing the used healthcare to form a disinfected material. The disinfected material is then sized and or sized and partially or completely homogenized into a particulate burnable fuel. The particulate burnable fuel can then be compression shaped into a shaped burnable fuel.

Embodiments of this invention relate to a system for converting a used healthcare material into a burnable fuel. The system includes a source of used healthcare material. The used healthcare material is then disinfected and/or partially or completely sterilized in a disinfecting facility to form a disinfected material. The disinfected material is then sized or sized and partially or completely homogenized in a sizing facility or sizing unit such as a shredding unit, chopping unit, a milling unit, or any other unit that reduces the size of the disinfected material to form a particulate burnable fuel. The particulate burnable fuel can then be packaged or containerized for ease of transport and use. The system can also include a shaping facility, where the particulate burnable fuel is compression formed or shaped into a shaped burnable fuel for ease of shipping and handling. The used healthcare material generally includes a complex mixture of components including pulp materials, polymer materials, metal materials, and/or other materials such as ceramic materials, ash materials, etc.

Embodiments of this invention provide burnable fuels including a complex mixture of components derived from a used healthcare material or a used healthcare material and an effective amount of a binding agent. The used healthcare material includes a complex mixture of components including pulp materials, polymer materials, metal materials, and/or other materials such as ceramic materials, ash materials, etc. The fuels can be formed into a compact shape such as a pellet or other compact shape for ease of handling and shipping.

Embodiments of this invention provide a method for making a burnable fuel, where the method includes receiving healthcare material contained in a closed receptacle delivered either through the mail or via other delivery agencies. The closed receptacles are either disinfected and/or partially or completely sterilized as is to form a disinfected material or burned as is to form an ash, where the ash may have un-utilized fuel value. If disinfected, the disinfected material is sized or sized and partially or completely homogenized to form a particulate burnable fuel, which can be either containerized for use as a direct fuel source or shaped into a shaped fuel source. If burned, the ash can be added to the unburned material at any point prior to the shaping step if present.

Suitable Reagents and Equipment of the Invention

Suitable used healthcare materials include, without limitation, any used healthcare material, which can include medical waste, generated by people, doctors, doctor offices, clinics, emergency clinics, hospitals, dentists, dentistry clinics and hospitals, veterinarians, veterinary clinics and hospitals, farms, farmer, ranches, ranchers, or producers of used healthcare material and/or other facilities that produce used healthcare material. The used healthcare material is generally a complex mixture of components. The complex mixtures include, without limitation, metal materials or metallic materials, pulp materials, polymer materials and/or other materials.

The pulp materials include, without limitation, paper, cardboard, natural fibers, synthetic fibers, cloth, fabrics, the like and/or mixtures or combinations thereof.

The metal or metallic materials include, without limitation, silver, gold, platinum, iron and iron alloys such as stainless steel, copper and copper alloys such as brass and bronze, aluminum and aluminum alloys, and/or other metals or alloys and/or mixtures or combinations thereof.

The polymer material includes, without limitation, plastics, thermoplastics, elastomers, thermoplastic elastomers, resins, and other polymer or polymeric materials and/or mixtures or combinations thereof.

The other materials can include, without limitation, chemicals, ash, pharmaceuticals, ceramics, binding agents, any other materials and/or mixtures or combinations thereof. The inventors have also found that ash derived from incinerating certain used healthcare materials, where the ash still has components or fuel value can be added to the material to change or augment a compositional makeup of the fuel.

In all of the mixtures, polymer materials from other sources of waste or virgin polymer materials can be added as binding agents to the material before burning or before forming the material into a desired compact shape followed by combustion of the fuel. The inventors believe that polymer materials act as binders in the shaping process, e.g., pelletizing, and help to increase the combustible nature of the resulting fuel.

The used healthcare material can include any mixture or combination of any of the above identified materials.

Suitable disinfecting and/or partially or completely sterilizing equipment include, without limitation, any equipment that can disinfect, and/or partially or completely sterilize used healthcare material such as autoclaves including those manufactured by OnSite Sterilization, LLC of Pottstown, Pa., chemical treatments, thermal treatments, radiant treatments, radiological treatments, or any combination thereof.

Suitable sizing and homogenizing equipment include, without limitation, shredders, grinders, choppers, hammer mills, ball mills, or any other equipment used to reduce the physical size of a complex material or any combination of these equipment in series, parallel or a combination thereof. Shedders including those manufactured by SSI Shredding Systems, Inc. of Wilsonville, Oreg.

Suitable shaping equipment includes, without limitation, pelletizes such as those manufactured by Roskamp Champion of Waterloo, Iowa or California Pellet Mill Co. of Crawfordsville, Ind., extruders, other compressing forming equipment or any combination thereof.

Suitable incinerator equipment include, without limitation, any incinerator equipment, pyrolysis treatments, plasma treatments, or other treatments that can burn or combust a used healthcare material to an ash, having a given un-used fuel value from 0 to some finite value. Exemplary examples include CONSUMAT® Incinerators manufactured by Consutech Systems, LLC (CONSUMAT is a registered trademark of Consutech Systems, LLC).

Suitable fuel utilization equipment include, without limitation, cement plants, power plants, municipal incinerators for steam generation, or any other facility that burns fuels and converts heat derived from the burning of the fuel into a usable form of energy or for use of the heat and ash to make an end product or any combination thereof.

For embodiments of the fuels derived from the present invention that is designed to be formed or shaped into a consolidated structure such as a pellet, the used healthcare material compositions includes an effective amount of binding agents, sufficient to permit the shaping to substantially maintain its final shape. The binding agents are selected from the group consisting of polymer materials that have a melting or softening temperature between about 40° C. and about 150° C. In certain embodiments, the binding agents are polymer components in used healthcare material having a melting or softening temperature between about 40° C. and about 150° C. Exemplary examples of such polymeric materials include, without limitation, modified cellulose, fabrics, plastics, thermoplastics, thermoplastic elastomers, elastomers, fiber enforced resins, metalized or metal coated plastics or polymers, or other polymeric materials and mixtures or combinations thereof. Exemplary plastics and thermoplastics include, without limitation, polyolefins, fluorinated polyolefins, chlorinated polyolefins, polyurethanes, polyalkyleneoxides, polyethers, polyesters, polyamides, polyimides, polycarbonates, epoxy resins, phenolic resins, alkylide resins, polyacrylates, polylactic acid, polyglycolic acid, other biocompatible polymers, and mixtures or combinations thereof. In other embodiments, binding agents can be added to the material to enhance or improve consolidation, to change or alter final ash composition, to reduce or increase metal content, to change or alter consolidated particle properties, to modify or change final particle appearance, or to enhance, improve, alter or change any other final property of the consolidated products of this invention. In specific, materials can be added to the burnable fuel as is or before shaping to adjust a heat content of the burnable fuel regardless of its nature or shape.

Used Healthcare Material Compositions Useful in the Invention

Embodiments of this invention include broad class distributions including polymer materials such as plastics, thermoplastics, etc., pulp materials such as paper materials, cardboard materials, natural fibrous material, fabrics, etc., and metal materials such as aluminum, aluminum alloys, iron, iron alloys, nickel, nickel alloys, tin, tin alloys, copper, copper alloys, etc. and/or mixtures of combinations thereof. As to these broad classes, the present invention relates to compositions including from about 20 wt. % to about 100 wt. % polymer materials, from about 0 wt. % to about 100 wt. % of pulp materials, and from about 0 wt. % to about 10 wt. % metal materials. In other embodiments, the compositions include from about 60 wt. % to about 100 wt. % polymer materials, from about 20 wt. % to about 100 wt. % of pulp materials, and from about 1 wt. % to about 10 wt. % metal materials. In other embodiments, the compositions include from about 70 wt. % to about 100 wt. % polymer materials, from about 15 wt. % to about 70 wt. % of pulp materials, and from about 0 wt. % to about 5 wt. % metal materials. In other embodiments, the compositions include from about 50 wt. % to about 70 wt. % polymer materials, from about 15 wt. % to about 70 wt. % of pulp materials, and from about 0 wt. % to about 5 wt. % metal materials. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the present invention relate to compositions including from about 20 wt. % to about 100 wt. % polymer materials, from about 0 wt. % to about 100 wt. % of pulp materials, from about 0 wt. % to about 10 wt. % metal materials, and from about 0 wt. % to about 50 wt. % other materials. In other embodiments, the compositions include from about 60 wt. % to about 100 wt. % polymer materials, from about 20 wt. % to about 100 wt. % of pulp materials, from about 1 wt. % to about 10 wt. % metal materials, and from about 0 wt. % to about 50 wt. % other materials. In other embodiments, the compositions include from about 70 wt. % to about 100 wt. % polymer materials, from about 15 wt. % to about 70 wt. % of pulp materials, from about 0 wt. % to about 5 wt. % metal materials, and from about 0 wt. % to about 50 wt. % other materials. In other embodiments, the compositions include from about 50 wt. % to about 70 wt. % polymer materials, from about 15 wt. % to about 70 wt. % of pulp materials, from about 0 wt. % to about 5 wt. % metal materials, and from about 0 wt. % to about 50 wt. % other materials. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the present invention relate to compositions including from about 0 wt. % to about 100 wt. % polymer materials, from about 10 wt. % to about 100 wt. % of pulp materials, from about 0 wt. % to about 10 wt. % metal materials, from about 5 wt. % to about 100 wt. % other materials, and from about 0 wt. % to about 40 wt. % of a binding agent. In other embodiments, the compositions include from about 10 wt. % to about 100 wt. % polymer materials, from about 20 wt. % to about 100 wt. % of pulp materials, from about 1 wt. % to about 10 wt. % metal materials, from about 10 wt. % to about 50 wt. % other materials, and from about 0 wt. % to about 30 wt. % of a binding agent. In other embodiments, the compositions include from about 20 wt. % to about 100 wt. % polymer materials, from about 30 wt. % to about 70 wt. % of pulp materials, from about 1 wt. % to about 5 wt. % metal materials, from about 30 wt. % to about 100 wt. % other materials, and from about 0 wt. % to about 20 wt. % of a binding agent. In other embodiments, the compositions include from about 30 wt. % to about 100 wt. % polymer materials, from about 15 wt. % to about 70 wt. % of pulp materials, from about 0 wt. % to about 5 wt. % metal materials, and from about 0 wt. % to about 50 wt. % other materials and from about 0 wt. % to about 20 wt. % of a binding agent. In these formulations, the weight percentages are not confined to add up to 100%, but are relative amounts on a weight basis of the final composition. To determine the actual percentage in final composition, all of the weight percentages would be added up to give the overall formulation weight, then simple percentages can be determined.

Embodiments of the used healthcare material of this invention can also be expressed as compositions, where the component percentages sum to one hundred. Table I shows a number of possible formulations.

TABLE I

| Material | Formulation Ranges Compositions | | | | | | | | | | | | | | | | | | |
|---|---|---|---|---|---|---|---|---|---|---|---|---|---|---|---|---|---|---|---|
| Polymer | 50 | 50 | 50 | 50 | 50 | 60 | 60 | 60 | 60 | 60 | 70 | 70 | 70 | 70 | 70 | 70 | 80 | 90 | 100 |
| Pulp | 50 | 40 | 40 | 25 | 20 | 40 | 30 | 30 | 20 | 15 | 30 | 15 | 10 | 20 | 15 | 20 | 10 | 0 | 0 |
| Metal | 0 | 10 | 5 | 0 | 10 | 0 | 10 | 5 | 0 | 10 | 0 | 0 | 10 | 10 | 10 | 5 | 1 | 1 | 0 |
| Other | 0 | 0 | 5 | 25 | 20 | 0 | 0 | 5 | 20 | 15 | 0 | 15 | 10 | 0 | 5 | 5 | 9 | 9 | 0 |
| Totals | 100 | 100 | 100 | 100 | 100 | 100 | 100 | 100 | 100 | 100 | 100 | 100 | 100 | 100 | 100 | 100 | 100 | 100 | 100 |

It should be recognized that there are simply a set of component break downs and any other component make up can be used provided that if the composition is to be shaped, there is sufficient polymer material in the material to allow the compressed material to hold its shape under normal handling condition. In certain embodiments, the shaping can be performed with added heat so that the polymer materials can be softened or melted to increase shape integrity and improve crush strength of the shaped material.

Disinfecting the Used Healthcare Material

Raw used healthcare material is disinfected and/or partially or completely sterilized using any methodology known to render a disinfected material, substantially free of any harmful pathogens. In certain embodiments of this invention, disinfecting and/or partial or complete sterilization is performed via autoclave sterilization. The raw used healthcare material is placed in an autoclave at a temperature and pressure and for a time sufficient to render a disinfected material, free or substantially free of any harmful pathogens. The temperature is generally greater than at least 121° C., at a pressure of at least 15 psi and for a time of at least 30 minutes. In certain embodiments, the temperature is between about 121° C. and about 150° C., the pressure is between about 15 psi and about 50 psi and for a time between about 30 minutes and 60 minutes. In certain embodiments, the temperature is between about 121° C. and about 125° C., the pressure is between about 15 psi and about 25 psi and for a time between about 30 minutes and 60 minutes. In certain embodiments, the temperature is between about 121° C. and about 123° C., the pressure is between about 15 psi and about 20 psi and for a time between about 30 minutes and 40 minutes. Although specific embodiments have been set forth on temperature, pressure and time, higher temperatures and/or pressures can be used as well as shorter or longer times depending on a desired outcome or property of the disinfected material.

Particle Distribution of Uses Healthcare Material

The used healthcare material, regardless of its make up, is sized or sized and partially or completely homogenized or otherwise processed to reduce the particle size of the material and to form a particulate material having a certain particle size distribution and a certain degree of homogeny. The exact particle size distribution depends on the nature of the sizing or sizing and partially or completely homogenizing equipment used and on the screens or other size exclusion means used to control the particle size of the exiting particulate material and end use needs. The distribution of the present invention includes particles having a smallest dimension of between about 1.00 mm and about 100 mm. In certain embodiments, the particles have a smallest dimension of between about 6.35 mm and about 50.8 mm. In certain embodiments, the particles have a smallest dimension between about 12.7 mm and about 50.8 mm. In other embodiments, the particles have a smallest dimension between about 19.05 mm and about 50.8 mm. In other embodiments, the particles have a smallest dimension between about 19.05 mm and about 44.45 mm. In other embodiments, the particles have a smallest dimension between about 19.05 mm and about 38.1 mm. In other embodiments, the particles have a smallest dimension between about 19.05 mm and about 25.4 mm. The smallest dimension means that the particles are capable of passing through a screen of a desired screen size. The screen size range between openings of about 12.7 mm to about 50.8 mm. In other embodiments, the screen opening ranges between about 19.05 mm and about 44.45 mm. In other embodiments, the screen opening ranges between about 19.05 and about 38.1 mm.

The term partially homogenized in the context of the present invention means that the particulate material, although being composed of many different material components, has been mixed sufficiently that the bulk composition of components is within about 30% the same throughout the entire particulate material. In certain, embodiments, the partial homogeneity is within 20% or lower. The term completely homogenized in the context of the present invention means that the particulate material, although being composed of many different material components, has been mixed sufficiently that the bulk composition of components is within about 10% the same throughout the entire particulate material. In certain, embodiments, the partial homogeneity is within 5%.

Compressed Shapes of Particulate Material

Optionally, the particulate material from the sizing process is then pressed, extruded or similarly processed into a shape to increase the bulk density of the material and for ease of handling and transport. The shape can be any shape including a cylindrical shape, a cubical shape, a rectangular solid shape, a spherical shape, an ellipsoidal shape, a tablet shape or any other compact 3D shape. In certain embodiments, the shape is substantially elongate having a diameter less than or equal to its length. The shape can be of a cylindrical type having sharp cut ends or rounded ends depending on the method used to make the elongate shape. Generally, the elongate shapes have a diameter between about 5 mm and about 20 mm and length of about 2 cm to about 10 cm. In certain embodiments, the elongate shape is cylindrical or substantially cylindrical. In other embodiments, the elongate shape has a diameter between about 10 mm and about 20 mm and a length between 3 cm and about 5 cm. In other embodiments, the elongate shape has a diameter between about 10 mm and about 15 mm and a length between 3 cm and about 5 cm. However, the shapes can be larger or smaller depending on end use.

Detailed Description of the Drawings

Methods

Figure 1:
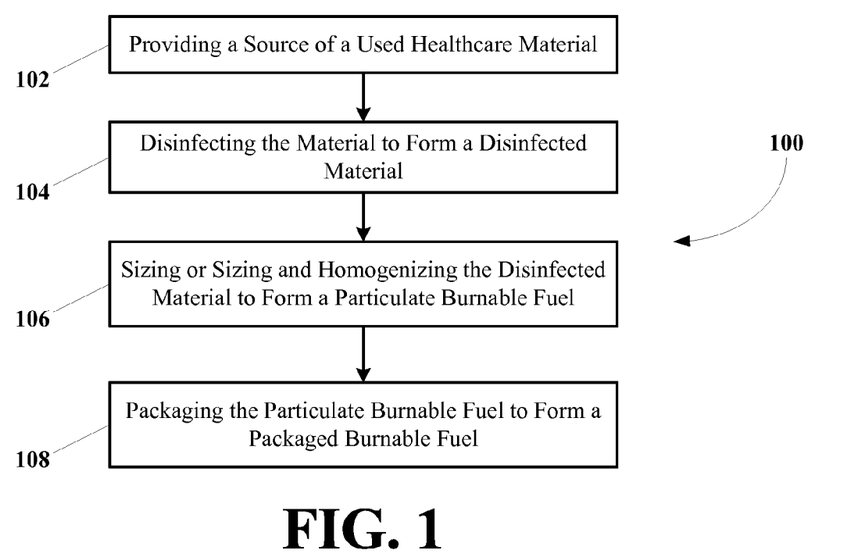
FIG. 1 depicts an embodiment of conceptual flow diagram of a method of this invention.

Referring now to FIG. 1, an embodiment of the present method, generally 100, is shown to include a providing step 102 of providing a source of used healthcare material having a certain component make-up. The method also includes a disinfecting step 104, where the material is disinfected and/or partially or completely sterilized to form a disinfected material. The method also includes a sizing or sizing and homogenizing step 106, where the disinfected material is sized or sized and partially or completely homogenized to form a particulate burnable fuel. The method also includes a packaging step 108, where the burnable fuel is packaged for shipment or transportation.

Figure 2:
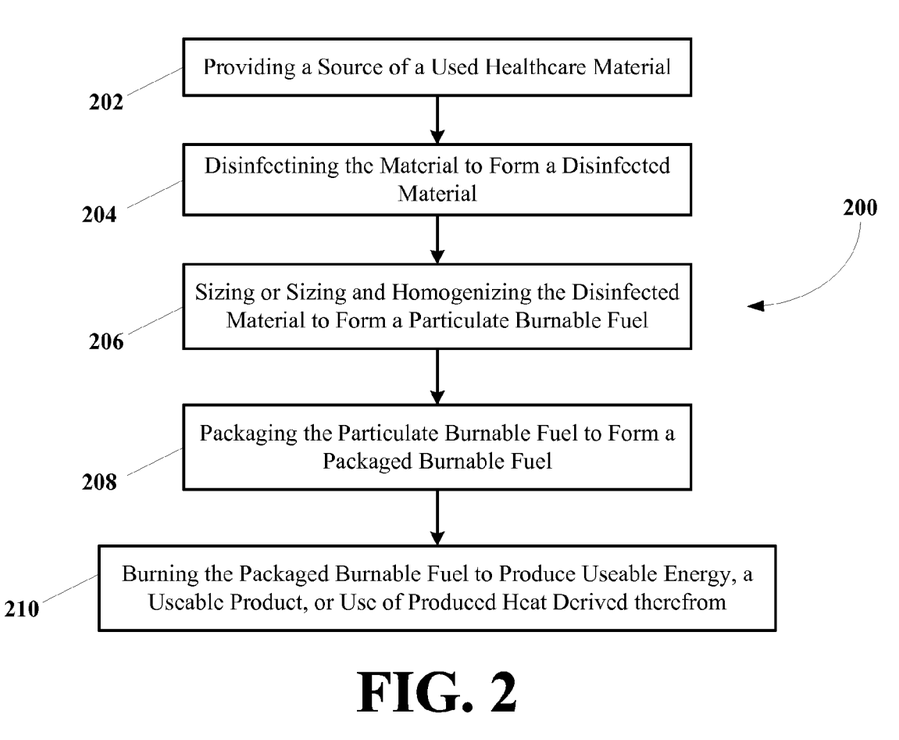
FIG. 2 depicts another embodiment of conceptual flow diagram of a method of this invention.

Referring now to FIG. 2, an embodiment of the present method, generally 200, is shown to include a providing step 202 of providing a source of used healthcare material having a certain component make-up. The method also includes a disinfecting step 204, where the material is disinfected and/or partially or completely sterilized to form a disinfected material. The method also includes a sizing or sizing and homogenizing step 206, where the disinfected material is sized and homogenized to form a particulate burnable fuel. The method also includes a packaging step 208, where the particulate burnable fuel is packaged for shipment or transportation. The method also includes a burning step 210, where the packaged, particulate burnable fuel is burned to produce a useable form of energy, to produce a useable product, or to otherwise use the heat derived therefrom.

Figure 3:
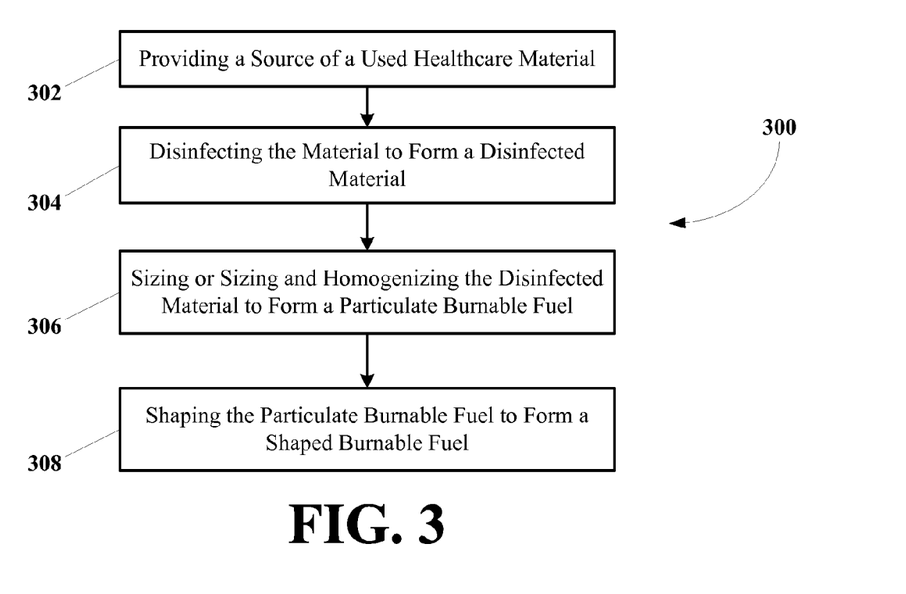
FIG. 3 depicts another embodiment of conceptual flow diagram of a method of this invention.

Referring now to FIG. 3, an embodiment of the present method, generally 300, is shown to include a providing step 302 of providing a source of used healthcare material having a certain component make-up. The method also includes a disinfecting step 304, where the material is disinfected and/or partially or completely sterilized to form a disinfected material. The method also includes a sizing or sizing and homogenizing step 306, where the disinfected material is sized and homogenized to form a particulate burnable fuel. The method also includes a shaping step 308, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape.

Figure 4:
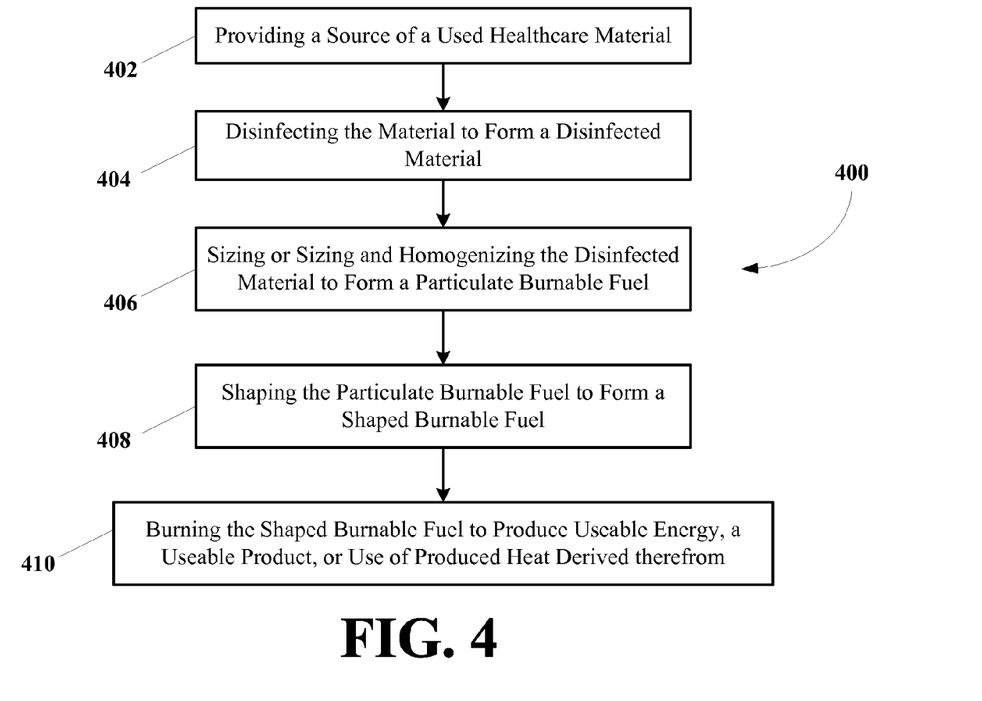
FIG. 4 depicts another embodiment of conceptual flow diagram of a method of this invention.

Referring now to FIG. 4, an embodiment of the present method, generally 400, is shown to include a providing step 402 of providing a source of used healthcare material having a certain component make-up. The method also includes a disinfecting step 404, where the material is disinfected and/or partially or completely sterilized to form a disinfected material. The method also includes a sizing or sizing and homogenizing step 406, where the disinfected material is sized or sized and homogenized to form a particulate burnable fuel. The method also includes a shaping step 408, where the particulate burnable fuel is formed into a burnable compact shape. The shaping step can be a pelletizing step, producing burnable fuel pellets, an extruding step, producing burnable extrudates, or any other step that forms the particular burnable fuel into a compact shape. The method also includes a burning step 410, where the shaped burnable fuel is burned to produce a useable form of energy, to produce a useable product, or to otherwise use the heat derived therefrom.

Figure 5:
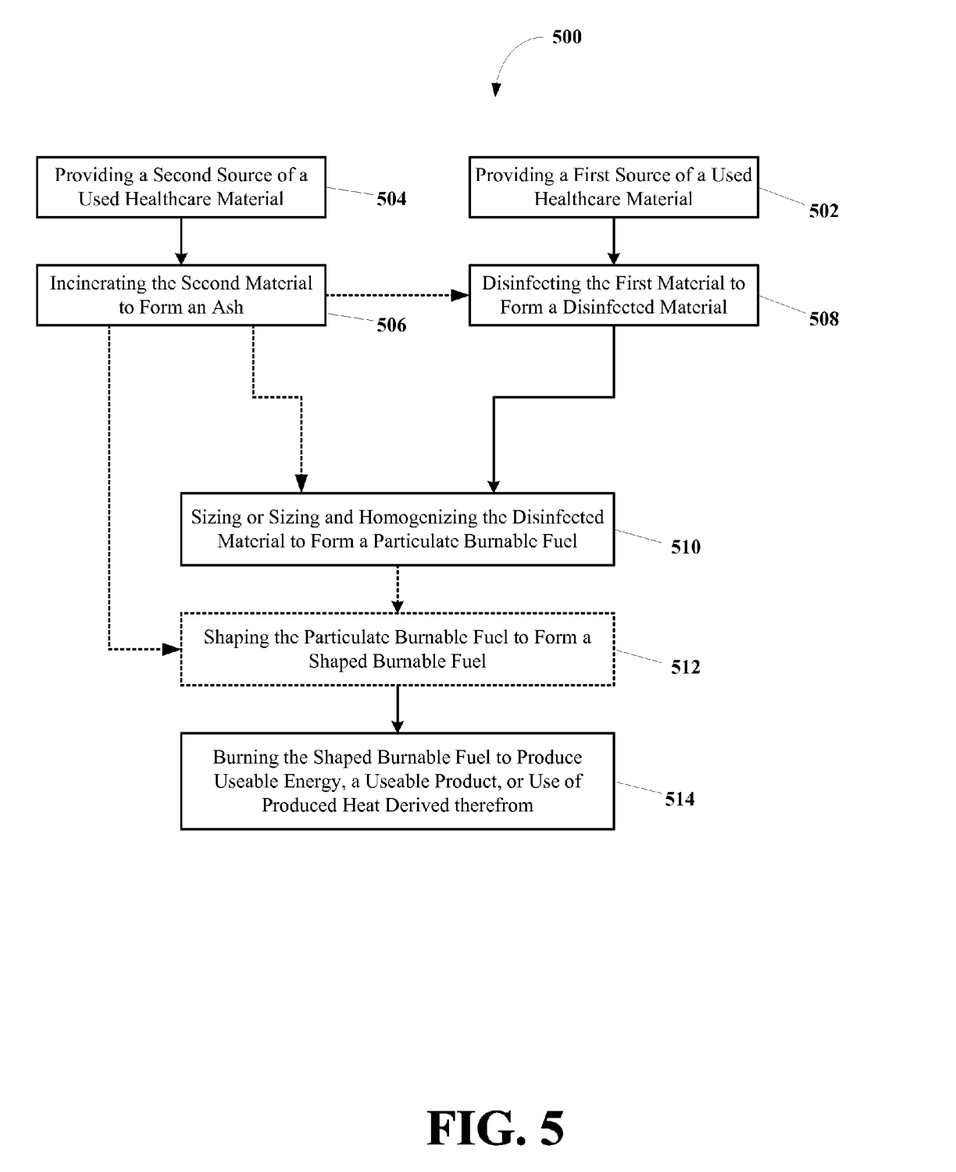
FIG. 5 depicts another embodiment of conceptual flow diagram of a method of this invention.

Referring now to FIG. 5, an embodiment of the present method, generally 500, is shown to include a first providing step 502 of providing a first source of used healthcare material having a certain component make-up. The method also includes a second providing step 504 of providing a second source of used healthcare material having a certain component make-up. The method also includes an incinerating step 506, where the first material is incinerated to form an ash may have an un-used fuel value. The method also includes a disinfecting step 508, where the first material and optionally all or a portion of the ash are disinfected and/or partially or completely sterilized to form a disinfected material. The method also includes a sizing or sizing and homogenizing step 510, where the disinfected material and optionally all or a portion of the ash are sized or sized and homogenized to form a particulate burnable fuel. The method also optionally includes a shaping step 512, where the particulate burnable fuel and optionally all or a portion of the ash are formed into a burnable compact shape. The shaping step can be a pelletizing step, producing burnable fuel pellets, an extruding step, producing burnable extrudates, or any other step that forms the particular burnable fuel into a compact shape. The method also includes a burning step 514, where the non-shaped or shaped burnable fuel is burned to produce a useable form of energy, to produce a useable product, or to otherwise use the heat derived therefrom.

Systems

Figure 6:
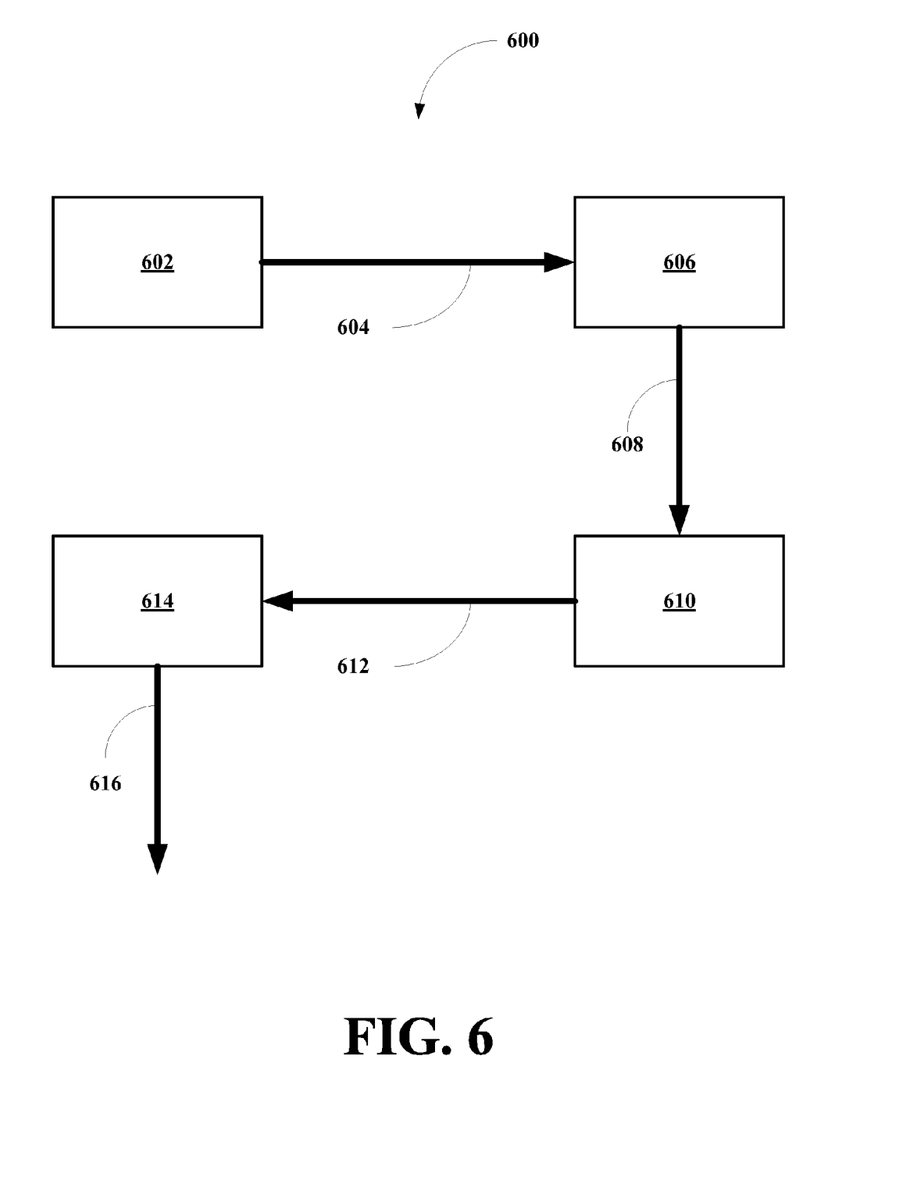
FIG. 6 depicts an embodiment of a system of this invention.

Referring now to FIG. 6, an embodiment of the present system, generally 600, is shown to include a source of used healthcare or raw material 602. The source 602 can be any source of a used healthcare material as described herein, where the material can include a variety of components including polymer materials, pulp materials, metal materials and/or other materials. The raw material 604 is then disinfected and/or partially or completely disinfected in a disinfecting facility 606 to produce a disinfected material 608. The disinfected material 608 is then sized or sized and partially or completely homogenized in sizing or sizing and homogenizing facility 610, where the disinfected material 608 is shredded, chopped, shattered, or broken to produce a particulate burnable fuel 612 having a desired particle size distribution. The particulate burnable fuel 612 is then forwarded to a packaging facility 614, where the particulate burnable fuel 612 is packaged into containers to produce a containerized particulate burnable fuel 616 for ease of shipment or transport and for direct use as a fuel to produce a useable form of energy, to produce a useable product, or to otherwise use the heat derived therefrom.

Figure 7:
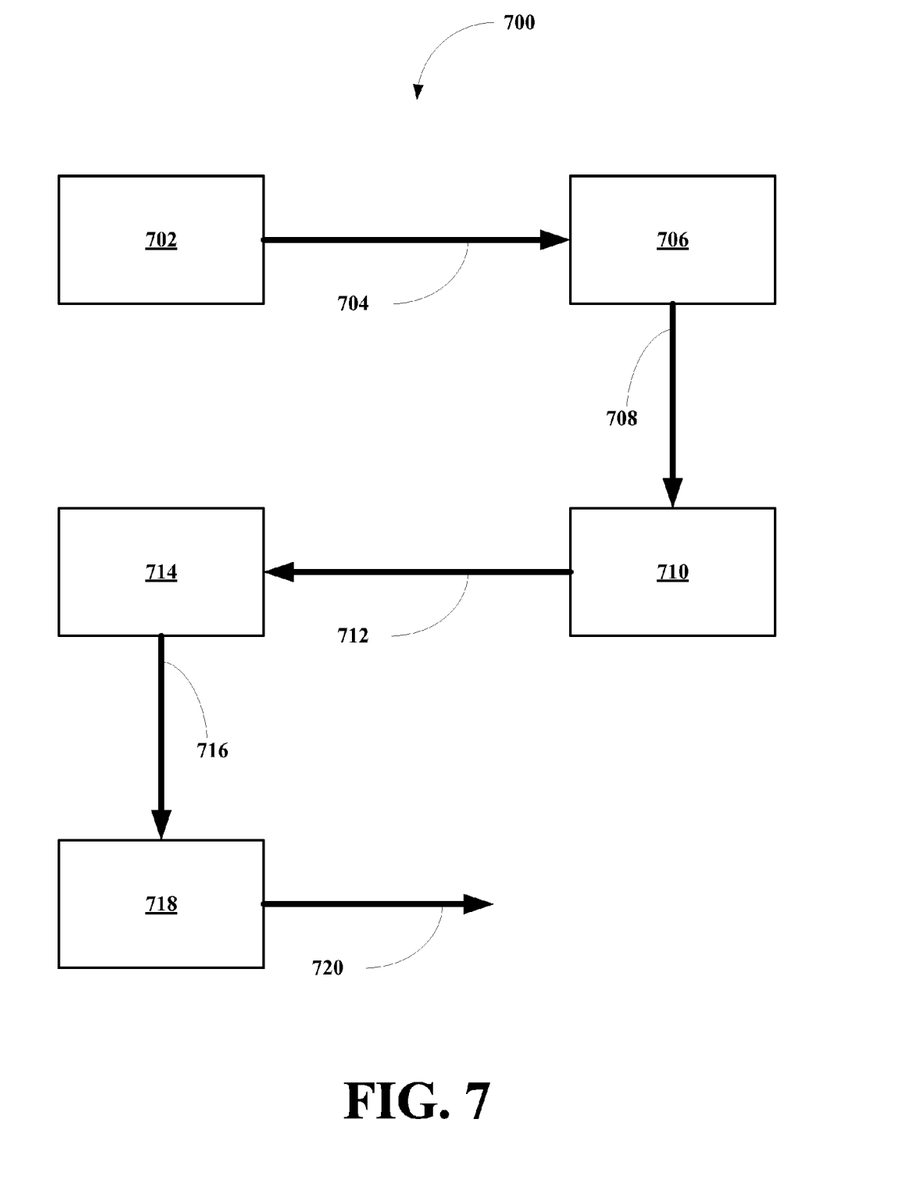
FIG. 7 depicts another embodiment of a system of this invention.

Referring now to FIG. 7, an embodiment of the present system, generally 700, is shown to include a source of used healthcare or raw material 702. The source 702 can be any source of a used healthcare material as described herein, where the material can include a variety of components including polymer materials, pulp materials, metal materials and/or other materials. The raw material 704 is then forwarded to a disinfecting facility 706, where the raw material 704 is disinfected and/or partially or completely sterilized to produce a disinfected material 708. The disinfected material 708 is then forwarded to a sizing or sizing and homogenizing facility 710, where the disinfected material 708 is shredded, chopped, shattered, or broken into a particulate burnable fuel 712 having a desired particle size distribution. The particulate burnable fuel 712 is then forwarded to a packaging facility 714, where the particulate burnable fuel 712 is placed in containers to produce a containerized particulate burnable fuel 716 for ease of shipment or transport and for direct use as a fuel to produce a useable form of energy, to produce a useable product, or to otherwise use the heat derived therefrom. The containerized particulate burnable fuel 716 is then forwarded to a combustion facility 718, where the containerized particulate burnable fuel 716 is burned as a fuel source to produce heat for use as a heat source of any other community, industrial or commercial facility, to generate electrical, mechanical and/or chemical energy, and/or to make a useable product such as cement 720.

Figure 8:
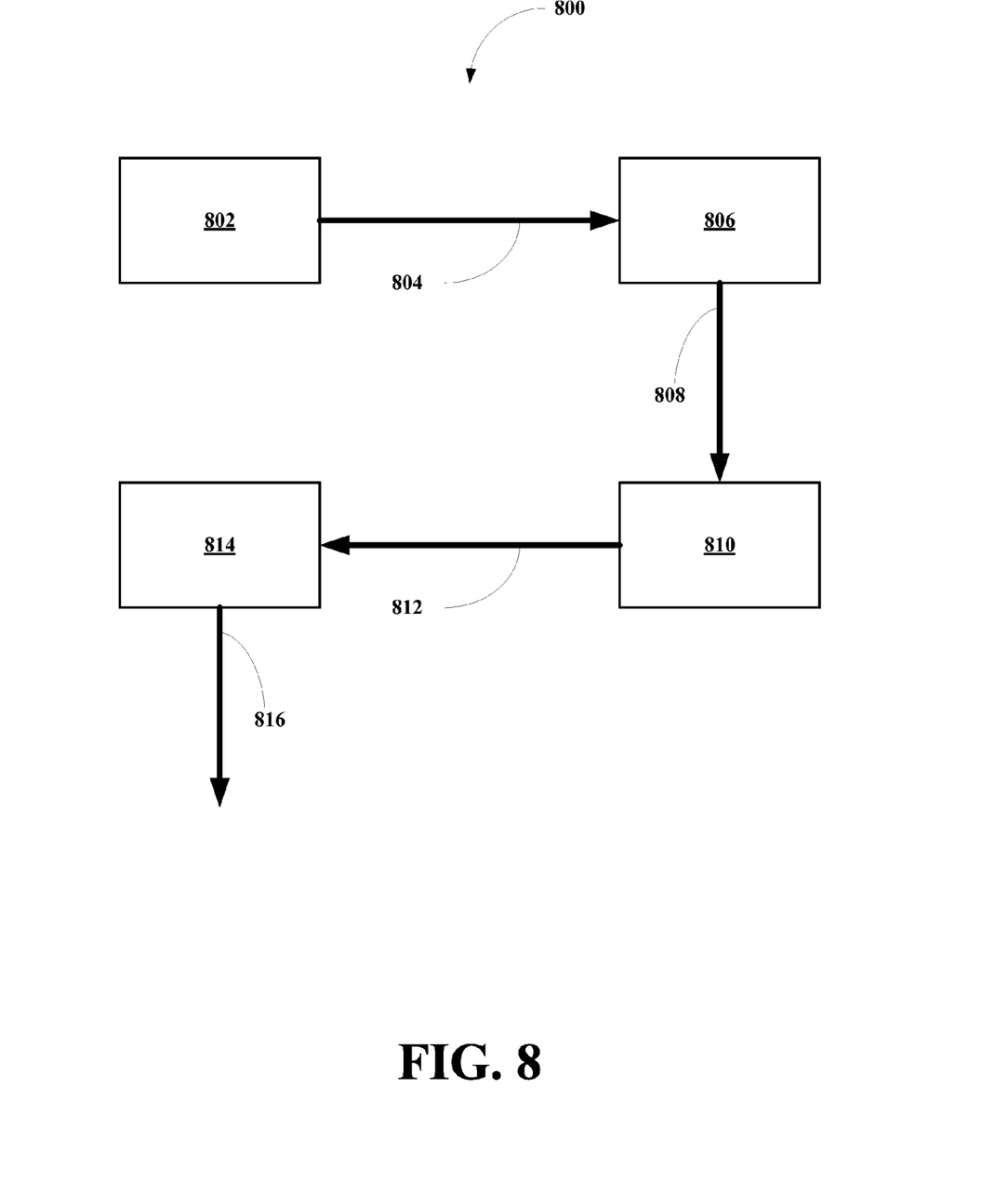
FIG. 8 depicts another embodiment of a system of this invention.

Referring now to FIG. 8, an embodiment of the present system, generally 800, is shown to include a source of used healthcare or raw material 802. The source 802 can be any source of a used healthcare material as described herein, where the material can include a variety of components including polymer materials, pulp materials, metal materials and/or other materials. The raw material 804 is then forwarded to a disinfecting facility 806, where the raw material 804 is disinfected and/or partially or completely sterilized to produce a disinfected material 808. The disinfected material 808 is then forwarded to a sizing or sizing and homogenizing facility 810, where the disinfected material 808 is shredded, chopped, shattered, or broken into a particulate burnable fuel 812 having a desired particle size distribution. The particulate burnable fuel 812 is then forwarded to a shaping facility 814, where the particulate burnable fuel 812 is formed into a compact shape to form a shaped burnable fuel 816 for ease of shipment or transport and for direct use as a fuel to produce a useable form of energy, to produce a useable product, or to otherwise use the heat derived therefrom.

Figure 9:
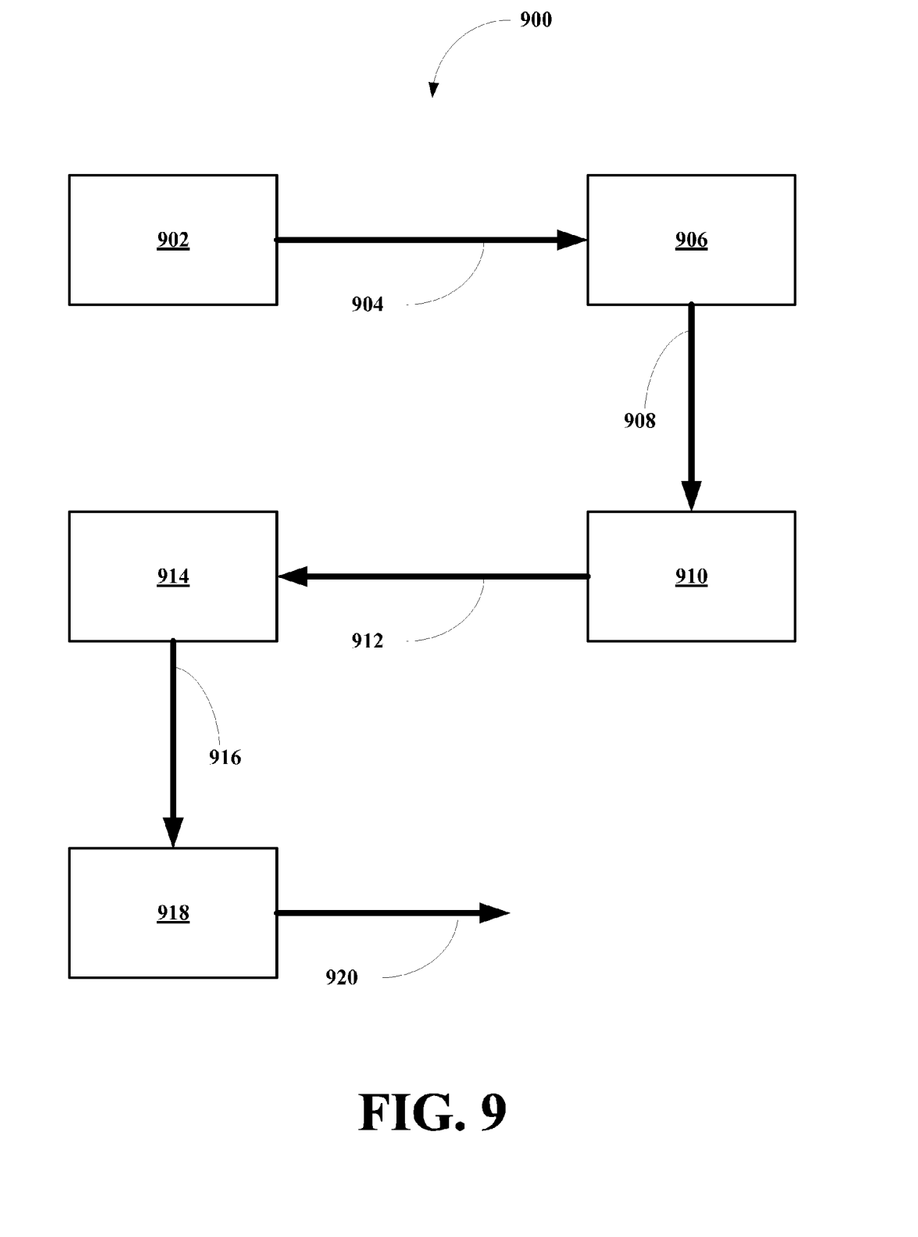
FIG. 9 depicts another embodiment of a system of this invention.

Referring now to FIG. 9, an embodiment of the present system, generally 900, is shown to include a source of used healthcare or raw material 902. The source 902 can be any source of a used healthcare material as described herein, where the material can include a variety of components including polymer materials, pulp materials, metal materials and/or other materials. The raw material 904 is then forwarded to a disinfecting facility 906, where the raw material 904 is disinfected and/or partially or completely sterilized to produce a disinfected material 908. The disinfected material 908 is then forwarded to a sizing or sizing and homogenizing facility 910, where the disinfected material 908 is shredded, chopped, shattered, or broken into a particulate burnable fuel 912 having a desired particle size distribution. The particulate burnable fuel 912 is then forwarded to a shaping facility 914, where the particulate burnable fuel 912 is formed into a compact shape to form a shaped burnable fuel 916. The shaped burnable fuel 916 is then forwarded to a combustion facility 918, where the shaped burnable fuel 916 is burned as a fuel source to produce a useable form of energy, to produce a useable product, or to otherwise use the heat derived therefrom.

Figure 10:
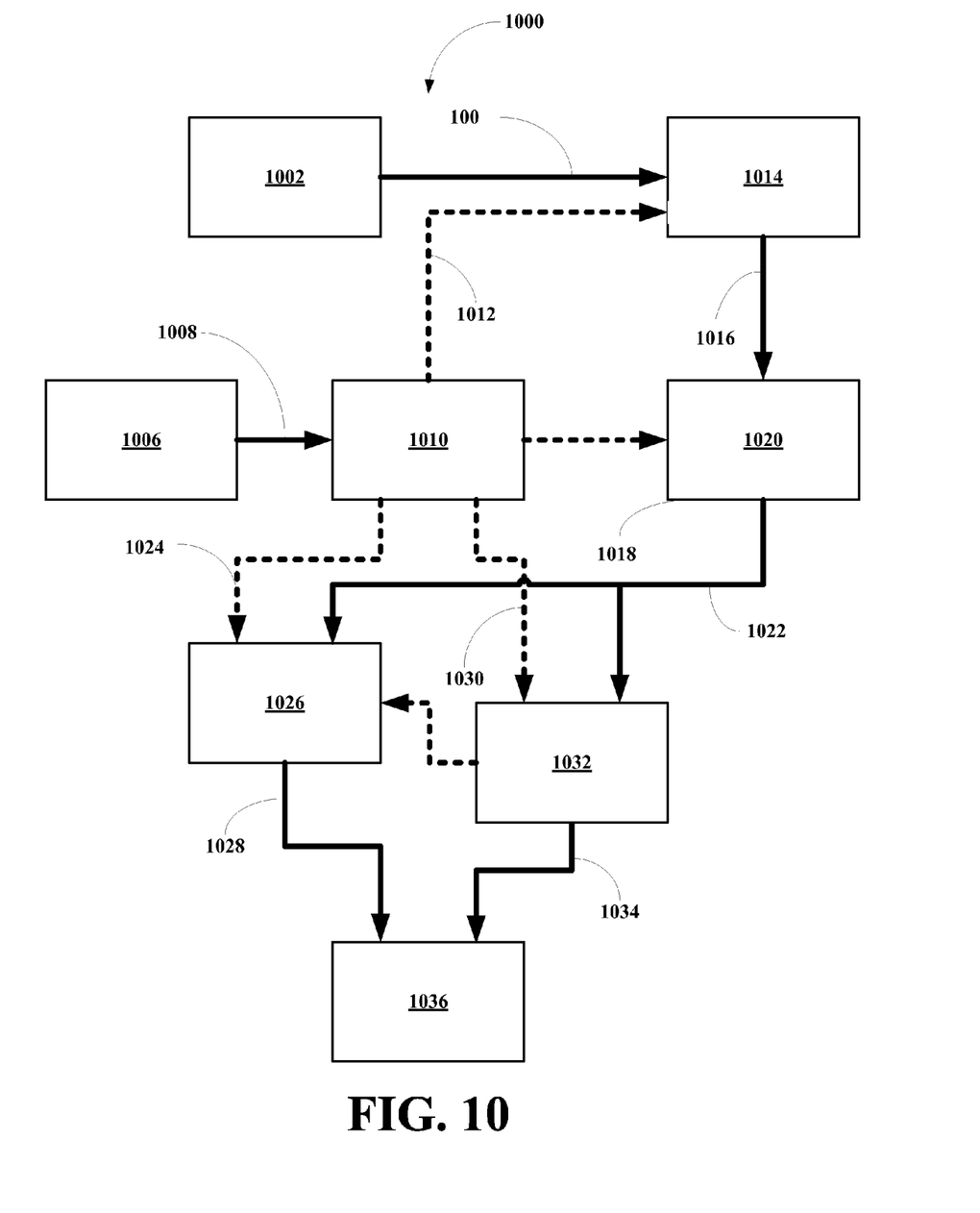
FIG. 10 depicts another embodiment of a system of this invention.

Referring now to FIG. 10, an embodiment of the present system, generally 1000, is shown to include a first source 1002 of a used healthcare material 1004. The first used healthcare material 1004 is as described herein and can include a variety of components including polymer materials, pulp materials, metal materials and/or other materials. The system also includes a second source 1006 of a second used healthcare material 1008. The second used healthcare material 1008 is as described herein and can include a variety of components including polymer materials, pulp materials, metal materials and/or other materials. The second material 1008 is then incinerated in an incinerator facility 1010 to form an ash, which may have an un-used fuel value or may have a inorganic element composition useful in the burnable fuel. The first material 1004 and none, all or a portion of the ash 1012 are disinfected and/or partially or completely sterilized in a disinfecting facility 1014 to produce a disinfected material 1016. The disinfected material 1016 and none, all or a portion of the ash 1018 are sized or size and homogenized in a sizing or sizing and homogenizing facility 1020 to produce a particulate burnable fuel 1022 having a desired particle size distribution. The sizing or sizing and homogenizing facility 1020 can shred, chop, shatter, and/or break the material into the particulate burnable fuel. None, all or a portion of the particulate burnable fuel 1022 and none, all or a portion of the ash 1024 are then packaged in a packaging facility 1026 to produce a containerized burnable fuel 1028. Alternatively, none, all or a portion of the particulate burnable fuel 1016 and none, all or a portion of the ash 1030 are forwarded to a shaping facility 1032 to produce a shaped burnable fuel 1034. Additionally, all or a portion of the shaped burnable fuel 1034 can be forwarded to the packaging facility 1026 to be packaged or containerized. The containerized burnable fuel 1020 and/or the shaped burnable fuel 1024 can then be forwarded to a utilization facility 1036, where the containerized burnable fuel 1020 and/or the shaped burnable fuel 1024 are burned as a fuel source to produce a useable form of energy, to produce a useable product, or to otherwise use the heat derived therefrom.

EXPERIMENTS OF THE INVENTION

Example 1

The following data was obtained from a pilot plant facility, where used healthcare material was disinfected and shredded to form the particulate burnable fuel of the present invention.

Used healthcare material was analyzed based on component makeup. The analysis revealed the component ranges set forth in Table II.

TABLE II

Constituent List and Ranges

| Constituent | % Range Low | % Range High | % Typical |
|---|---|---|---|
| Plastic | 50 | 100 | 70 |
| Cardboard | 15 | 100 | 29 |
| Stainless Steel | 0 | 5 | 1 |

Example 2

The following data was obtained from a pilot plant facility, where used healthcare material was disinfected and shredded to form a burnable fuel and an ash obtained from burning of other used healthcare material were burned and the resulting ash analyzed.

Samples were received in 2.5 gallon buckets and were non-homogeneous. Samples were shredded for particle size reduction. Coarsely milled and finely milled sample splits were returned and showed some inhomogeneity. The more finely milled sample split was utilized for all analyses.

Due to sample inhomogeneity, all analyses were performed multiple times (duplicate minimum) and values reported as represent "best value" averages. All data were reported on a finely milled sample weight basis.

Samples were stage ashed to 750° C. and held at temperature for 8 hours for ash percentage determination. After weighing, ash residues were fused with lithium metaborate for ash component analyses.

Metals except for mercury were determined by ICP-AES and ICP-MS after total sample decomposition with mixed acids including hydrofluoric acid or by high temperature fusion of sample ash with lithium metaborate. Mercury was determined by combustion/amalgamation cold vapor atomic absorption.

Bromide, chloride, nitrate, sulfate, and ortho-phosphate were measured by ion chromatography on washings from oxygen bomb combustion, and do not necessarily represent elements in these oxidation states prior to combustion.

Higher heating value is the gross calorific content and has not been corrected for possible sulfur content according to ASTM D5865.

The incinerated ash had a BTU/lb value of 5321 resulting in a 49 wt. % residue after burning at 750° C. The resulting ash had an elemental analysis tabulated in TABLE III.

TABLE III

Element Analysis of Ash in µg/g

| $Br^-$ | $Cl^-$ | $NO_3^-$ | $SO_4^{2-}$ | $o\text{-}PO_4^{3-}$ | Ag | Al |
|---|---|---|---|---|---|---|
| 60 | 1730 | 440 | 2840 | <20 | 26 | 36500 |
| As | Ba | Be | Cd | Ca | Co | Cr |
| 3.6 | 6000 | 0.7 | 1.5 | 23600 | 24 | 1060 |
| Cu | Fe | Pb | Mg | Mn | Hg | Ni |
| 450 | 12100 | 162 | 7800 | 340 | 0.12 | 500 |
| K | Si | Na | Tl | Ti | Zn | |
| 5370 | 119000 | 16700 | 0.04 | 5560 | 4390 | |

The particulate burnable fuel had a BTU/lb value of 16400 resulting in a 5.6 wt. % residue after burning at 750° C. The particulate burnable fuel had an elemental analysis tabulated in TABLE IV.

TABLE IV

Element Analysis of Particulate Burnable Fuel in μg/g

| Br⁻ | Cl⁻ | NO₃⁻ | SO₄²⁻ | o-PO₄³⁻ | Ag | Al |
|---|---|---|---|---|---|---|
| <20 | 240 | 71000 | 1400 | <20 | 78 | 2420 |
| As | Ba | Be | Cd | Ca | Co | Cr |
| 1.6 | 710 | 0.1 | 0.1 | 1950 | 33 | 4700 |
| Cu | Fe | Pb | Mg | Mn | Hg | Ni |
| 110 | 33400 | 24 | 210 | 580 | 0.06 | 2870 |
| K | Si | Na | Tl | Ti | Zn | |
| 560 | 5610 | 1280 | <0.01 | 1520 | 330 | |

Example 3

A used healthcare material was obtained, disinfected, shredded and pelletized.

Figure 11:
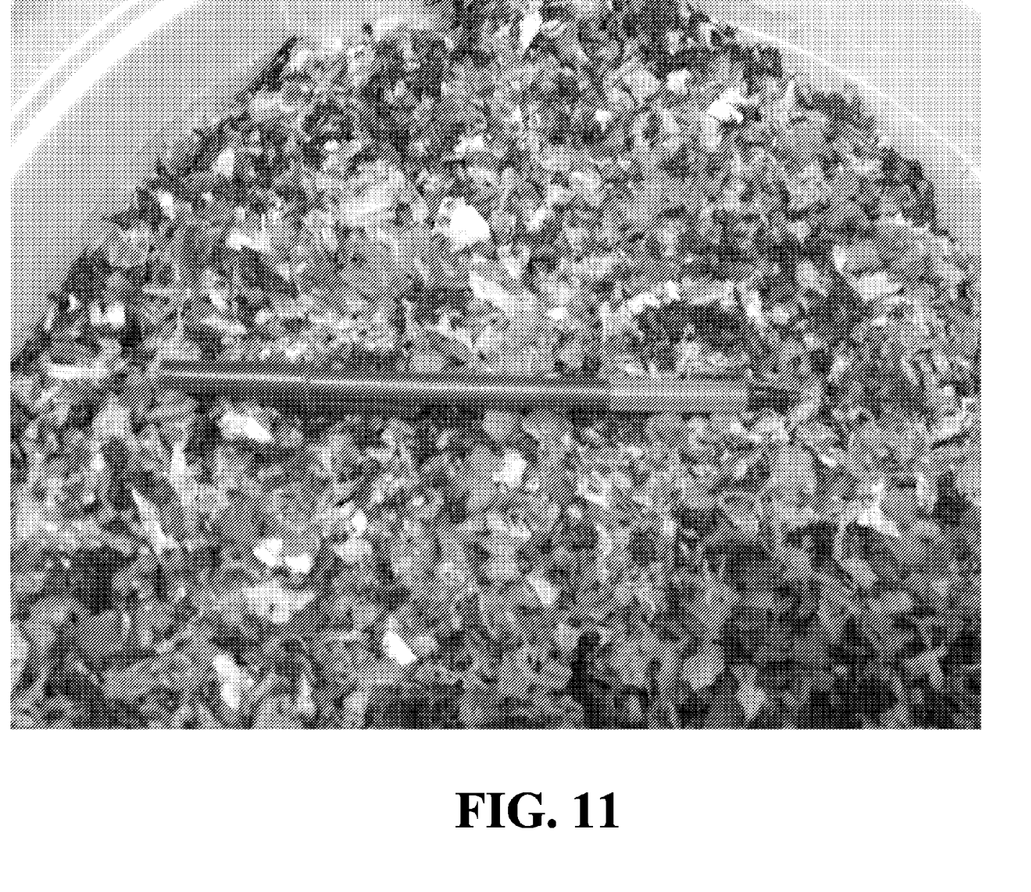
FIG. 11 depicts a photograph of a particulate burnable fuel of this invention comprising particles between about 19.05 mm and about 38.1 mm.

Referring to FIG. 11, a photograph of the particulate burnable fuel is shown comprising particles between about 19.05 mm and about 38.1 mm. The particulate burnable fuel had a bulk density between about 12 lb/ft³ (0.19 g/cm³) and about 15 lb/ft³ (0.24 g/cm³). The particulate burnable fuel can have a greater or lower density depending on composition and/or processing.

Figure 12:
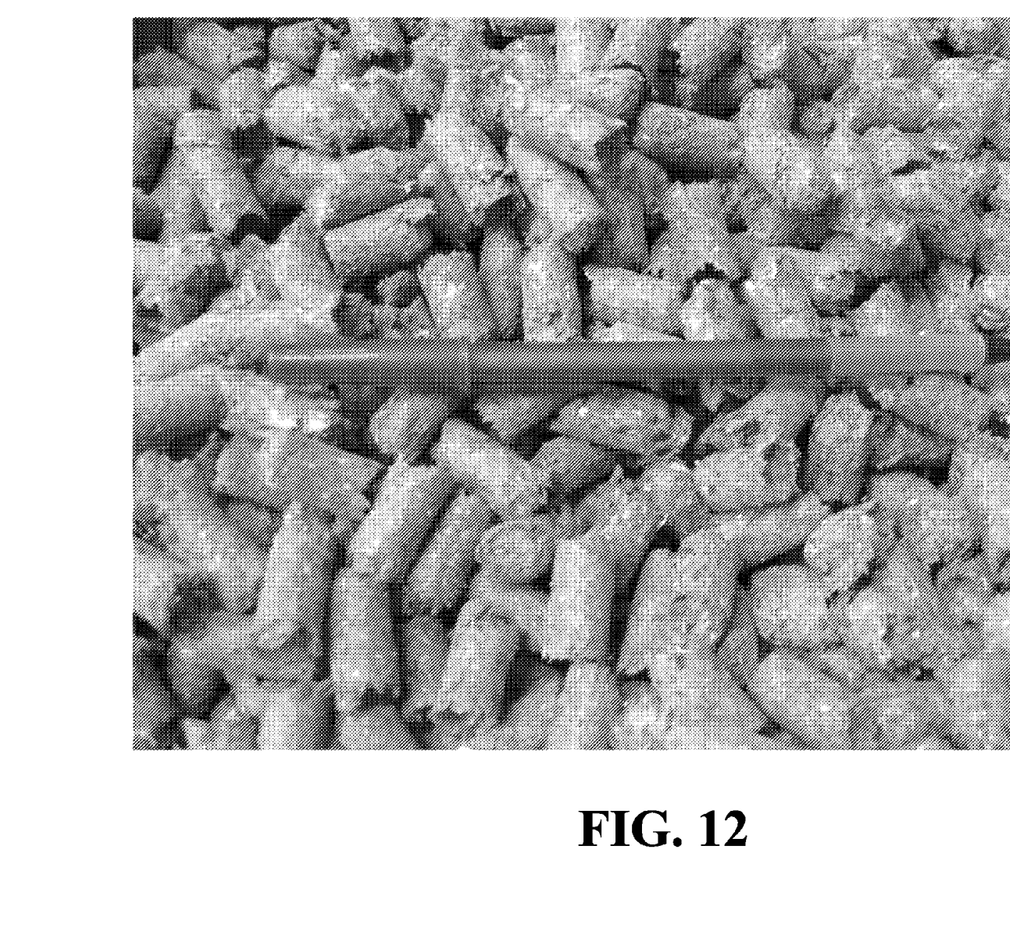
FIG. 12 depicts the burnable fuel of FIG. 11 that has been pelletized to form shaped substantially cylindrical shapes having a diameter between about 10 mm and about 15 mm and a length between 3 cm and about 5 cm.

Referring to FIG. 12, the burnable fuel of FIG. 11 was pelletized to form shaped substantially cylindrical shapes. The shapes have a diameter between about 10 mm and about 15 mm and a length between 3 cm and about 5 cm. The shapes are shown here to be cracked with jagged ends. The shaped burnable fuel had a bulk density of 20 lb/ft³ (0.19 g/cm³) and about 30 lb/ft³ (0.19 g/cm³). In other embodiments, the bulk density of the shaped burnable fuel can range between about 20 lb/ft³ (0.19 g/cm³) and about 65 lb/ft³ (1.04 g/cm³). In other embodiments, the bulk density of the shaped burnable fuel can range between about 0.10 g/cm³ and about 1.5 g/cm³. In other embodiments, the bulk density of the shaped burnable fuel can range between about 0.25 g/cm³ and about 1.5 g/cm³. In other embodiments, the bulk density of the shaped burnable fuel can range between about 0.25 g/cm³ and about 1.25 g/cm³. The shaped burnable fuel can have a greater or lower density depending on composition and/or processing.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for making a burnable fuel comprising:
   providing a used healthcare material comprising a complex mixture of components, where the components include pulp materials and/or polymer materials, and metal materials;
   disinfecting and/or partially sterilizing the used healthcare material to form a disinfected material; and
   sizing or sizing and partially or completely homogenizing the disinfected material into a particulate burnable fuel, where the fuel is suitable for use in cement plants, power plants, municipal incinerators for steam generation, or any other facility that burns fuels and converts heat derived from the burning of the fuel into a usable form of energy or for use of the heat and ash to make an end product, where a polymer content of the particulate burnable fuel is sufficient to render the particular burnable fuel capable of being shaped and to hold its shape after shaping, and where the heat content of the fuel is adjustable based on the mixture of components.

2. The method of claim 1, further comprising:
   packaging the particulate burnable fuel to form a containerized particulate burnable fuel.

3. The method of claim 1, further comprising:
   shaping the particulate burnable fuel to form a shaped burnable fuel, where the particulate burnable fuel has sufficient polymer materials to hold its shape.

4. The method of claim 1, further comprising:
   shaping the particulate burnable fuel to form a shaped burnable fuel, where the particulate burnable fuel has sufficient polymer materials to holds its shape, and
   packaging the shaped burnable fuel to form a containerized shaped burnable fuel.

5. The method of claim 1, further comprising:
   combusting the particulate burnable fuel in a combustion unit, where a portion of the heat is converted into a useable form of energy or where a portion of the heat and the ash are used to form a product.

6. The method of claim 2, further comprising:
   combusting the containerized particulate burnable fuel in a combustion unit, where a portion of the heat is converted into a useable form of energy or where a portion of the heat and the ash are used to form a product.

7. The method of claim 3, further comprising:
   combusting the shaped burnable fuel in a combustion unit, where a portion of the heat is converted into a useable form of energy or where a portion of the heat and the ash are used to form a product.

8. The method of claim 1, wherein the used healthcare material is contained in a closed receptacle delivered by a delivery agency and the closed receptacle is disinfected and sized directly.

9. The method of claim 1, further comprising:
   combusting a second used healthcare material to form an ash material, where the ash material has a fuel content having a value equal or greater than zero.

10. The method of claim 9, further comprising:
    mixing the ash material with the used healthcare material, the disinfected material or the particular burnable fuel.

11. The method of claim 1, wherein the components further include other materials comprising ceramic materials, ash materials, ash, or mixtures thereof.

12. The method of claim 1, wherein the metal materials are selected from the group consisting of aluminum, aluminum alloys, iron, iron alloys, nickel, nickel alloys, tin, tin alloys, copper, copper alloys, and mixtures or combinations thereof.

13. The method of claim 1, wherein the used healthcare material includes from about 20 wt. % to about 100 wt. % polymer materials, from about 0 wt. % to about 100 wt. % of pulp materials, and from about 1 wt. % to about 10 wt.% metal materials, where the weight percentages are not confined to add up to 100%, but are relative amounts on a weight basis of the final composition.

14. The method of claim 11, wherein the used healthcare material includes from about 20 wt. % to about 100 wt. % polymer materials, from about 0 wt. % to about 100 wt. % of pulp materials, from about 1 wt. % to about 10 wt. % metal materials, and from about 0 wt. % to about 50 wt. % the other materials, where the weight percentages are not confined to add up to 100%, but are relative amounts on a weight basis of the final composition.

15. The method of claim 11, wherein the used healthcare material includes from about 0 wt. % to about 100 wt. % polymer materials, from about 10 wt. % to about 90 wt. % of pulp materials, from about 1 wt. % to about 10 wt. % metal materials, from about 5 wt. % to about 100 wt. % the other materials, and from about 0 wt. % to about 40 wt. % of a binding agent, where the weight percentages are not confined to add up to 100%, but are relative amounts on a weight basis of the final composition.

16. The method of claim 1, wherein the disinfecting is at a temperature greater than at least 121° C., at a pressure of at least 15 psi and for a time of at least 30 minutes.

17. The method of claim 1, wherein the particles have a smallest dimension of about 1.00 mm.

18. The method of claim 1, wherein the particles have a smallest dimension about 19.05 mm.

19. The method of claim 3, where the shape is an elongate shape having a diameter between about 5 mm and about 20 mm and length of about 2 cm to about 10 cm.

20. The method of claim 19, wherein the elongate shape is a cylindrical shape or substantially cylindrical shape.

21. The method of claim 3, wherein the shape is an elongate shape having a diameter between about 10 mm and about 20 mm and a length between 3 cm and about 5 cm.

22. The method of claim 3, wherein the shape is an elongate shape having a diameter between about 10 mm and about 15 mm and a length between 3 cm and about 5 cm.

23. A system for making a burnable fuel comprising:
a source of a used healthcare material comprising a complex mixture of components, where the components include pulp materials and/or polymer materials, and metal materials;
a disinfection unit, where the used healthcare material is disinfected and/or partially sterilized to form a disinfected material;
a sizing unit, where the disinfected material is then sized or sized and partially or completely homogenized to form a particulate burnable fuel,
where the fuel is suitable for use in cement plants, power plants, municipal incinerators for steam generation, or any other facility that burns fuels and converts heat derived from the burning of the fuel into a usable form of energy or for use of the heat and ash to make an end product, where a polymer content of the particulate burnable fuel is sufficient to render the particular burnable fuel capable of being shaped and to hold its shape after shaping, and where the heat content of the fuel is adjustable based on the mixture of components.

24. The system of claim 23, wherein the sizing unit comprises a shredding unit, chopping unit, or a milling unit.

25. The system of claim 23, further comprising:
a packaging or containerizing unit, where the particulate burnable fuel is packaged into containers to form a containerized particulate burnable fuel for ease of transport and use.

26. The system of claim 23, further comprising:
a shaping unit, where the particulate burnable fuel is compression formed or shaped into a shaped burnable fuel for ease of shipping and handling and where the particulate burnable fuel has sufficient polymer materials to hold its shape.

27. The system of claim 23, further comprising:
a shaping facility, where the particulate burnable fuel is compression formed or shaped into a shaped burnable fuel for ease of shipping and handling and where the particulate burnable fuel has sufficient polymer materials to hold its shape; and
a packaging or containerizing unit, where the particulate burnable fuel is packaged into containers to form a containerized particulate burnable fuel for ease of transport and use.

28. The system of claim 23, wherein the metal materials are selected from the group consisting of aluminum, aluminum alloys, iron, iron alloys, nickel, nickel alloys, tin, tin alloys, copper, copper alloys, and mixtures or combinations thereof.

29. The system of claim 23, wherein the used healthcare material includes from about 20 wt. % to about 100 wt. % polymer materials, from about 0 wt. % to about 100 wt. % of pulp materials, and from about 1 wt. % to about 10 wt. % metal materials, where the weight percentages are not confined to add up to 100%, but are relative amounts on a weight basis of the final composition.

30. The system of claim 23, wherein the particles have a smallest dimension of about 1.00 mm.

31. The system of claim 23, wherein the particles have a smallest dimension about 19.05 mm.

32. The system of claim 26, where the shape is an elongate shape having a diameter between about 5 mm and about 20 mm and length of about 2 cm to about 10 cm.

33. The system of claim 32, wherein the elongate shape is a cylindrical shape or substantially cylindrical shape.

34. The system of claim 26, wherein the shape is an elongate shape having a diameter between about 10 mm and about 20 mm and a length between 3 cm and about 5 cm.

35. The system of claim 26, wherein the shape is an elongate shape having a diameter between about 10 mm and about 15 mm and a length between 3 cm and about 5 cm.

36. A burnable fuel composition comprising a shaped burnable fuel, where the burnable fuel comprises a particulate burnable fuel including a disinfected used healthcare material, optionally an ash and optionally a binding agent, where the used healthcare material comprises pulp materials and/or polymer materials, and metal materials, where the particulate burnable fuel has sufficient polymer materials to hold its shape after shaping, where the heat content of the fuel is adjustable based on the mixture of components, where the shaped burnable fuel is suitable for use in cement plants, power plants, municipal incinerators for steam generation, or any other facility that burns fuels and converts heat derived from the burning of the fuel into a usable form of energy or for use of the heat and ash to make an end product.

37. The composition of claim 36, wherein the shaped burnable fuel comprises compression formed 3D compact shapes.

38. The composition of claim 36, wherein the useable energy includes electrical energy, mechanical energy, and/or chemical energy.

39. The composition of claim 36, further comprising an effective amount of the binding agent.

40. The composition of claim 36, wherein the metal materials are selected from the group consisting of aluminum, aluminum alloys, iron, iron alloys, nickel, nickel alloys, tin, tin alloys, copper, copper alloys, and mixtures or combinations thereof.

41. The composition of claim 36, wherein the used healthcare material includes from about 20 wt. % to about 100 wt. % polymer materials, from about 0 wt. % to about 100 wt. % of pulp materials, and from about 1 wt. % to about 10 wt. % metal materials, where the weight percentages are not confined to add up to 100%, but are relative amounts on a weight basis of the final composition.

42. The composition of claim 36, wherein the particles have a smallest dimension of about 1.00 mm.

43. The composition of claim 36, wherein the particles have a smallest dimension about 19.05 mm.

44. The composition of claim 36, where the shape is an elongate shape having a diameter between about 5 mm and about 20 mm and length of about 2 cm to about 10 cm.

45. The composition of claim 44, wherein the elongate shape is a cylindrical shape or substantially cylindrical shape.

46. The composition of claim 36, wherein the shape is an elongate shape having a diameter between about 10 mm and about 20 mm and a length between 3 cm and about 5 cm.

47. The composition of claim 36, wherein the shape is an elongate shape having a diameter between about 10 mm and about 15 mm and a length between 3 cm and about 5 cm.

48. The composition of claim 36, wherein the components further include other materials comprising ceramic materials, ash materials, ash, or mixtures thereof.

49. The composition of claim 36, wherein the compact 3D shape comprises a cylindrical shape, a cubical shape, a rectangular solid shape, a spherical shape, an ellipsoidal shape, or a tablet shape.

50. The composition of claim 48, wherein the used healthcare material includes from about 20 wt. % to about 100 wt. % polymer materials, from about 0 wt. % to about 100 wt. % of pulp materials, from about 1 wt. % to about 10 wt. % metal materials, and from about 0 wt. % to about 50 wt. % the other materials, where the weight percentages are not confined to add up to 100%, but are relative amounts on a weight basis of the final composition.

51. The composition of claim 48, wherein the used healthcare material includes from about 0 wt. % to about 100 wt. % polymer materials, from about 10 wt. % to about 100 wt. % of pulp materials, from about 1 wt. % to about 10 wt. % metal materials, from about 5 wt. % to about 100 wt. % the other materials, and from about 0 wt. % to about 40 wt. % of a binding agent, where the weight percentages are not confined to add up to 100%, but are relative amounts on a weight basis of the final composition.

52. The system of claim 23, wherein the components further include other materials comprising ceramic materials, ash materials, ash, or mixtures thereof.

53. The system of claim 52, wherein the used healthcare material includes from about 20 wt. % to about 100 wt. % polymer materials, from about 0 wt. % to about 100 wt. % of pulp materials, from about 1 wt. % to about 10 wt. % metal materials, and from about 0 wt. % to about 50 wt. % the other materials, where the weight percentages are not confined to add up to 100%, but are relative amounts on a weight basis of the final composition.

54. The system of claim 52, wherein the used healthcare material includes from about 0 wt. % to about 100 wt. % polymer materials, from about 10 wt. % to about 100 wt. % of pulp materials, from about 1 wt. % to about 10 wt. % metal materials, from about 5 wt. % to about 100 wt. % the other materials, and from about 0 wt. % to about 40 wt. % of a binding agent, where the weight percentages are not confined to add up to 100%, but are relative amounts on a weight basis of the final composition.

\* \* \* \* \*